US008037306B2

(12) United States Patent
Wei et al.

(10) Patent No.: US 8,037,306 B2
(45) Date of Patent: *Oct. 11, 2011

(54) METHOD FOR REALIZING NETWORK ACCESS AUTHENTICATION

(75) Inventors: Wei Wei, Beijing (CN); Yadong Qu, Beijing (CN); Jun Chen, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 637 days.

This patent is subject to a terminal disclaimer.

(21) Appl. No.: 11/817,189

(22) PCT Filed: Dec. 8, 2005

(86) PCT No.: PCT/CN2005/002129
§ 371 (c)(1),
(2), (4) Date: Sep. 8, 2008

(87) PCT Pub. No.: WO2006/089473
PCT Pub. Date: Aug. 31, 2006

(65) Prior Publication Data
US 2009/0019528 A1 Jan. 15, 2009

(30) Foreign Application Priority Data

Feb. 28, 2005 (CN) .......................... 2005 1 0051117

(51) Int. Cl.
*H04L 9/00* (2006.01)
(52) U.S. Cl. ............ 713/168; 713/150; 713/175; 726/4; 726/22; 726/27; 380/277; 380/278; 709/224; 709/225
(58) Field of Classification Search ........................ None
See application file for complete search history.

(56) References Cited

U.S. PATENT DOCUMENTS
6,185,678 B1 * 2/2001 Arbaugh et al. ................. 713/2
(Continued)

FOREIGN PATENT DOCUMENTS
JP 2002092221 A 3/2002
(Continued)

OTHER PUBLICATIONS

Handbook of Applied Cryptography by Menezes et al; Year: 1996; Publisher: CRC Press.*

(Continued)

*Primary Examiner* — Taghi Arani
*Assistant Examiner* — Amir Mehrmanesh
(74) *Attorney, Agent, or Firm* — Kinney & Lange, P.A.

(57) ABSTRACT

A method for realizing network access authentication, wherein a network access authentication device pre-storing a system integrity value of a device waiting to access and a correspondence between each device waiting to access and its system integrity value. When the device waiting to access needs to access the network, it acquires its current system integrity value, and sends the current system integrity value to the network access authentication device; the network access authentication device judges whether the received current system integrity value of the device waiting to access and its stored integrity value of the device waiting to access are identical or not, and in a case where the received current system integrity value of the device waiting to access and its stored integrity value of the device waiting to access are identical, it determines that the network access is authenticated. As such, the network access device could determine the real status of the device waiting to access, and ensure the device accessing to the network is really secure, thereby ensuring the security of the network.

14 Claims, 2 Drawing Sheets

U.S. PATENT DOCUMENTS

| | | | |
|---|---|---|---|
| 7,475,427 B2* | 1/2009 | Palliyil et al. | 726/24 |
| 2002/0066009 A1* | 5/2002 | Tung | 713/1 |
| 2003/0028761 A1* | 2/2003 | Platt | 713/150 |
| 2003/0120953 A1* | 6/2003 | Radatti | 713/201 |
| 2004/0083375 A1* | 4/2004 | Foster et al. | 713/189 |
| 2004/0128518 A1 | 7/2004 | Cavers et al. | 713/185 |
| 2004/0250121 A1 | 12/2004 | Millar | 713/201 |
| 2004/0250167 A1* | 12/2004 | Sato et al. | 714/38 |
| 2004/0268145 A1* | 12/2004 | Watkins et al. | 713/201 |
| 2006/0143271 A1* | 6/2006 | Murphy et al. | 709/206 |

FOREIGN PATENT DOCUMENTS

| | | |
|---|---|---|
| JP | 1423452 A | 6/2003 |
| JP | 1479483 A | 3/2004 |
| JP | 2008522292 A | 6/2008 |
| WO | WO 03/090402 | 10/2003 |
| WO | WO 2004/044687 | 5/2004 |

OTHER PUBLICATIONS

Office Action of the Japanese Patent Office dated Mar. 23, 2010, in foreign counterpart Application No. 2007-556479.

Network Construction Simulation, Dec. 2004, pp. 888-893.

Maruyama, "Trusted Platform on Demand," IPSJ SIG Technical Reports, vol. 2004, No. 22, pp. 181-186.

Information Processing Society of Japan, 2004, vol. 45, No. 4, 470.

* cited by examiner

---

METHOD FOR REALIZING NETWORK ACCESS AUTHENTICATION

CROSS-REFERENCE TO RELATED APPLICATION

This Application is a Section 371 National Stage Application of International Application No. PCT/CN2005/002129, filed Dec. 8, 2005 and published as WO 2006/089473 on Aug. 31, 2006, not in English, the contents of which is hereby incorporated by reference in its entirety.

BACKGROUND OF THE INVENTION

1. Field of Invention

The present invention relates to a field of network access authentication technique and trusted calculation technique, and more particularly, to a method for realizing network access authentication.

2. Description of Prior Art

Currently, authentication processing, which a network access authentication device performs on a device waiting to access, is implemented mainly based on the following technical protocols:
(1) Password Authentication Protocol;
(2) Protocol based on Sharing Key and Challenging Response;
(3) Protocol based on Dynamic One-Time Password;
(4) Authentication Protocol based on Public Key System.

The ideas of all the above authentication processing are: the network access authentication device determines whether the device waiting to access is allowed to access or not by judging whether the device waiting to access owns a password and/or a key required for the authentication protocols or not. The purpose of the above authentication processing is to ensure that the device accessing the network is not an attacker but a secure device. However, if the device waiting to access itself has been attacked (e.g., it has been imported a Trojan Horse virus program), when the device is accessing the network, the Trojan Horse virus program inside may listen to the authentication processing, and may steal key information on the device waiting to access through listening, then may personate the device waiting to access with other device or utilize the device waiting to access to attack the network.

It can be seen from above that only authenticating the password and/or key can not ensure that the device waiting to access is really secure and thus can not ensure the security of network.

SUMMARY OF THE INVENTION

Accordingly, a main object of the present invention is to provide a method for realizing network access authentication, which enables the network access authentication device to confirm the real state of the device waiting to access in order to ensure the device accessing the network is really secure.

To achieve the above purpose, the technical aspects of the present invention are implemented as follows:

A method for realizing network access authentication, wherein a network access authentication device pre-storing a system integrity value of a device waiting to access which is calculated by the device waiting to access itself, and a correspondence between each device waiting to access and its system integrity value, the method comprises the following steps:
a) the device waiting to access acquires its current system integrity value, and sends an authentication request including information containing the current system integrity value to the network access authentication device;
b) the network access authentication device judges whether the current system integrity value of the device waiting to access in the received authentication request and its stored system integrity value of the device waiting to access are identical or not, according to the received authentication request and the correspondence; and, in a case where the received current system integrity value of the device waiting to access in the received authentication request and its stored system integrity value of the device waiting to access are identical, the network access authentication device determines that the network access is authenticated.

Preferably, the current system integrity value is a basic system integrity value;
the step a) of the device waiting to access acquiring its current system integrity value comprises:
when the device waiting to access is initiated, its current basic system integrity value is calculated and stored in a secure storage unit; when it needs to access the network, the device waiting to access extracts the basic system integrity value directly from the secure storage unit as the current system integrity value.

Preferably, the current system integrity value is a system integrity value calculated with a basic system integrity value and a module for network access;
the step a) of the device waiting to access acquiring its current system integrity value comprises:
when the device waiting to access is initiated, its current basic system integrity value is calculated and stored in a secure storage unit; when it needs to access the network, the device waiting to access extracts the basic system integrity value directly from the secure storage unit, and performs integrity calculation with the module for network access in order to obtain the calculated value as its current system integrity value.

Preferably, the module for network access comprises a driver module for link layer network, a software module for network layer and transport layer protocols and a software module for network access application.

Preferably, the device waiting to access is a computer, and the process of calculating its basic system integrity value comprises the following steps:
i) when the computer is powered on, integrity values for system ROM, BIOS or EFI firmware codes and hardware configuration parameters are calculated and stored in a secure storage unit;
ii) when BIOS or EFI is initiated, integrity values for all configured system parameters, main booting sector and system booting partition are calculated and stored in the secure storage unit;
iii) before BIOS or EFI is loaded into booting OS (operating system), an integrity value for codes to be loaded into the OS is calculated and stored in the secure storage unit;
iv) when the codes are loaded into the OS, integrity values for OS kernel, system initiation files, system configuration files and driver software are calculated and stored in the secure storage unit;
v) when the OS is initiated, an integrity value for application software is calculated and stored in the secure storage unit;
vi) the basic system integrity value is calculated based on all the integrity values obtained in step i) to step vi).

Preferably, the configured system parameters comprise: CPU microcode software, enable or disable status configuration of various system functions, various authentication passwords, disk configuration parameters, peripheral configuration parameters and security function configuration parameters.

Preferably, the secure storage unit is a secure chip TPM, a hard disk with security-protecting function, a USB-key or a smart-card.

Preferably, the step b) further comprises: authenticating the creditability of the received information.

Preferably, the device waiting to access pre-generates public/private keys, and the public/private keys are signed by a trusted third party;

before the device waiting to access sends the authentication request, the step a) comprises: the current system integrity value is signed with the private key; wherein information in the authentication request is the current system integrity value in plaintext, and the authentication request further comprises a signature for the current system integrity value and the public key;

the authentication to the creditability of the received information comprises: the network access authentication device authenticates whether the received signature is correct by using the received public key; and if so, judges that the received information is creditable; otherwise, judges that the received information is not creditable.

Preferably, the device waiting to access pre-generates public/private keys and the public/private keys are signed by a trusted third party, wherein the public key is pre-stored in the network access authentication device;

before the device waiting to access sends the authentication request, the step a) further comprises: the current system integrity value is signed with the private key; wherein information in the authentication request is the current system integrity value in plaintext, and the authentication request further comprises a signature for the current system integrity value;

the authentication to the creditability of the received information comprises: the network access authentication device authenticates whether the received signature is correct by using the pre-stored public key; and if so, judges that the received information is creditable; otherwise, judges that the received information is not creditable.

Preferably, the device waiting to access pre-generates public/private keys and the public/private keys are not signed by a trusted third party;

before the device waiting to access sends the authentication request, the step a) further comprises: the current system integrity value is signed with the private key; wherein information in the authentication request is the current system integrity value in plaintext, and the authentication request further comprises a signature for the current system integrity value, an anonymous identity certificate and the public key;

the authentication to the creditability of the received information comprises: after the network access authentication device authenticates that the identity of the sender is legal with the received anonymous identity certificate, the network access authentication device authenticates whether the signature is correct with the received public key; and if so, judges that the received information is creditable; otherwise, judges that the received information is not creditable.

Preferably, the device waiting to access and the network access authentication device pre-store a symmetric key;

before the device waiting to access sends the authentication request, the step a) further comprises: the current system integrity value is encrypted with the symmetrical key; wherein information in the authentication request is the symmetrical-key-encrypted current system integrity value;

the authentication to the creditability of the received information comprises: the network access authentication device decrypts the received information with its stored symmetric key; and judges that the received information is creditable in case of successful decryption, whereas judges that the received information is not creditable in case of unsuccessful decryption.

Preferably, the method further comprises: a system integrity value of the network access authentication device is pre-stored in the device waiting to access;

after the device waiting to access acquires the current system integrity value of the network access authentication device and authenticates that the acquired current system integrity value of the network access authentication device and the stored system integrity value of the network access authentication device are identical, the step a) is performed then.

Preferably, the network access authentication device consists of one server, or a firewall, a switch or a router together with an authentication server.

Preferably, the method further comprises: in a case where the current system integrity value of the device waiting to access in the received authentication request and the stored system integrity value of the device waiting to access are not identical, the network access authentication device sends to the device waiting to access an alarm prompt indicating that the device waiting to access is not secure.

Preferably, information interacting between the network access authentication device and the device waiting to access is carried via an SSL protocol, a TLS protocol, an IPv6 protocol, or an IKE protocol in IPSec.

Preferably, when the information interacting between the network access authentication device and the device waiting to access is carried via the SSL protocol or the TLS protocol, after the device waiting to access in the step a) receives a ServerHello message from a server, the information containing the integrity value is sent to the network access authentication device with a handshake protocol, or the information containing the integrity value is included in a ClientHello message sent by the device waiting to access in the step a); alternatively when the information interacting between the network access authentication device and the device waiting to access is carried via the IPv6 protocol or the IKE protocol in IPSec, the device waiting to access in the step a) sends the information containing the integrity value to the network access authentication device with a handshake protocol when sending HDR, SA.

The key point of the present invention is that the system integrity value of the device waiting to access and the correspondence between the device waiting to access and its system integrity value are pre-stored in the network access authentication device. The device waiting to access acquires its current system integrity value when it needs to access the network, and sends the current system integrity value to the network access authentication device. The network access authentication device judges whether the received current system integrity value of the device waiting to access and its stored system integrity value are identical or not. If so, the network access is authenticated; otherwise, the network access authentication is failed. Thus, the network access authentication device can confirm the real status of the device waiting to access in order to ensure that the device accessing the network is really secure, thereby ensuring the security of the network.

DETAILED DESCRIPTION OF PREFERRED EMBODIMENTS

Figure 1:
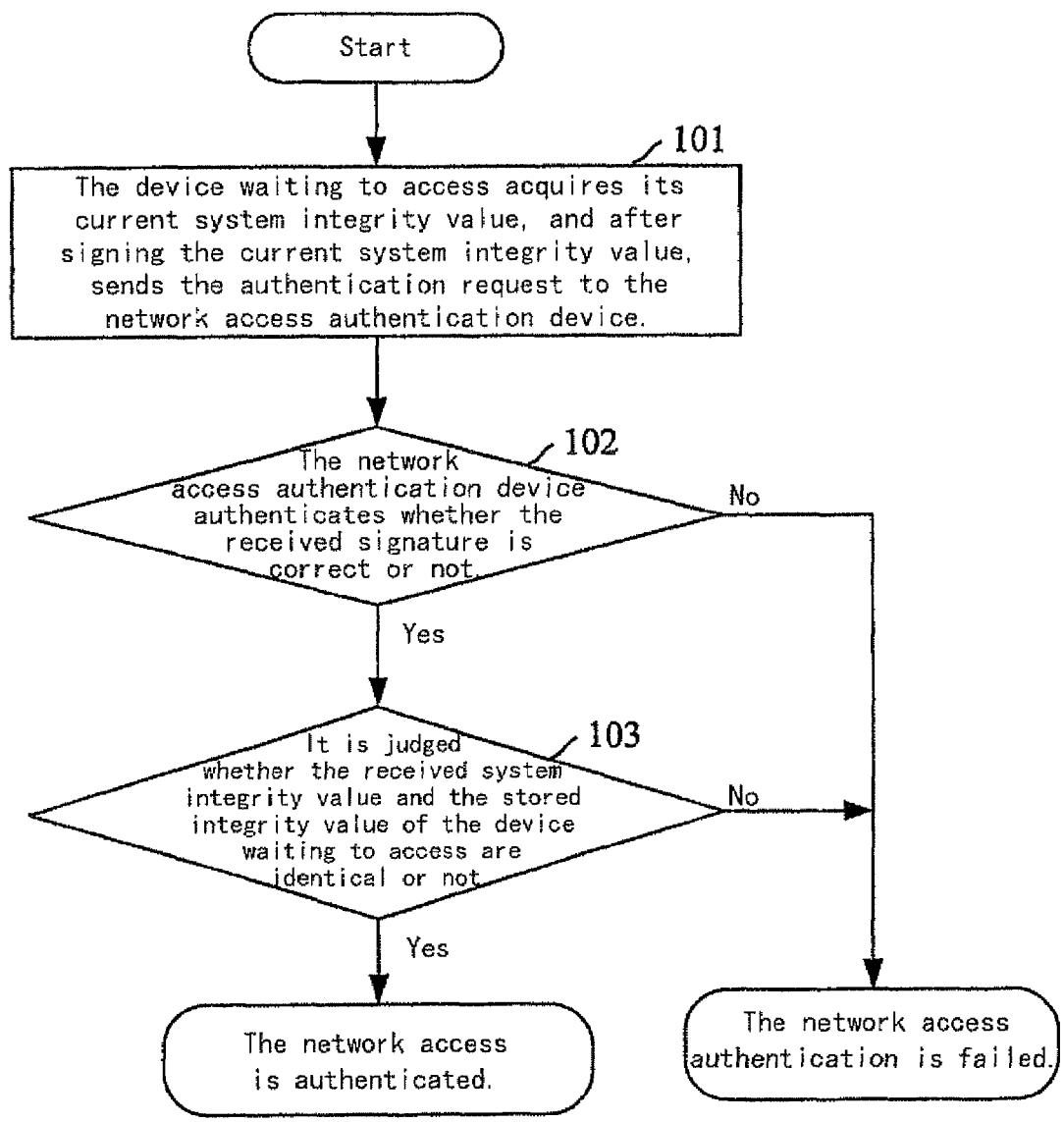
FIG. 1 is an illustrative flowchart of an embodiment according to the present invention.

Hereinafter, the present invention will be further described in detail by referring to the drawings and the embodiments.

The principal idea of the present invention is that the system integrity value of the device waiting to access and the correspondence between each device waiting to access and its system integrity value are pre-stored in the network access authentication device. The device waiting to access acquires its current system integrity value when it needs to access the network, and sends the current system integrity value to the network access authentication device. The network access authentication device judges whether the received current system integrity value of the device waiting to access and its stored system integrity value are identical or not. If so, the network access is authenticated; otherwise, the network access authentication is failed.

FIG. 1 is an illustrative flowchart of an embodiment according to the present invention. The system integrity value calculated by the device waiting to access itself and the correspondence between each device waiting to access and its system integrity value are pre-stored in the network access authentication device. The device waiting to access pre-generates public/private keys and the public/private keys are signed by a trusted third party.

In step 101, the device waiting to access acquires the current system integrity value, and signs the current system integrity value with the above private key Then, the device waiting to access sends the authentication request which contains the current system integrity value, the signature of the current system integrity value and the public key.

In step 102, the network access authentication device authenticates whether the received signature is correct with the received public key when it receives the information from the device waiting to access. If the signature is correct, it means that the received information is creditable and step 103 is performed; and if the signature is not correct, it means that the received information is not creditable, and the network access authentication is failed.

In step 103, according to the received authentication request and the correspondence, the network access authentication device obtains the system integrity value of the device waiting to access, and judges whether the received current system integrity value of the device waiting to access and its stored system integrity value corresponding to the device waiting to access are identical or not. If so, the network access is authenticated; otherwise, the network access authentication is failed.

If the network access authentication is failed, the network access authentication device may further send to the device waiting to access an alarm prompt indicating that the device waiting to access is currently not secure. For example, the alarm prompt indicates that there is a security vulnerability in the device waiting to access or indicates that the device waiting to access has been attacked, etc.

Thus, the network access authentication device completes the access authentication on the device waiting to access.

The current system integrity value as described above may be a basic system integrity value, or an integrity value calculated with the basic system integrity value and a module for network access together.

If the current system integrity value is the basic system integrity value, the method for the device waiting to access in step 101 acquiring its current system integrity value comprises: each time when the device waiting to access is initiated, its current basic system integrity value is calculated and stored in a secure storage unit; the device waiting to access extracts the basic system integrity value directly from the secure storage unit as the current system integrity value.

If the current system integrity value is the integrity value calculated with the basic system integrity value and the module for network access, the method for the device waiting to access in step 101 acquiring its current system integrity value comprises: each time when the device waiting to access is initiated, its current basic system integrity value is calculated and stored in a secure storage unit; when it needs to access the network, the device waiting to access extracts the basic system integrity value directly from the secure storage unit, calculates with the module for network access and obtains the calculated value as its current system integrity value. The module for network access comprises a driver module for link layer network, a software module for network layer and transport layer protocols and a software module for network access application.

Figure 2:
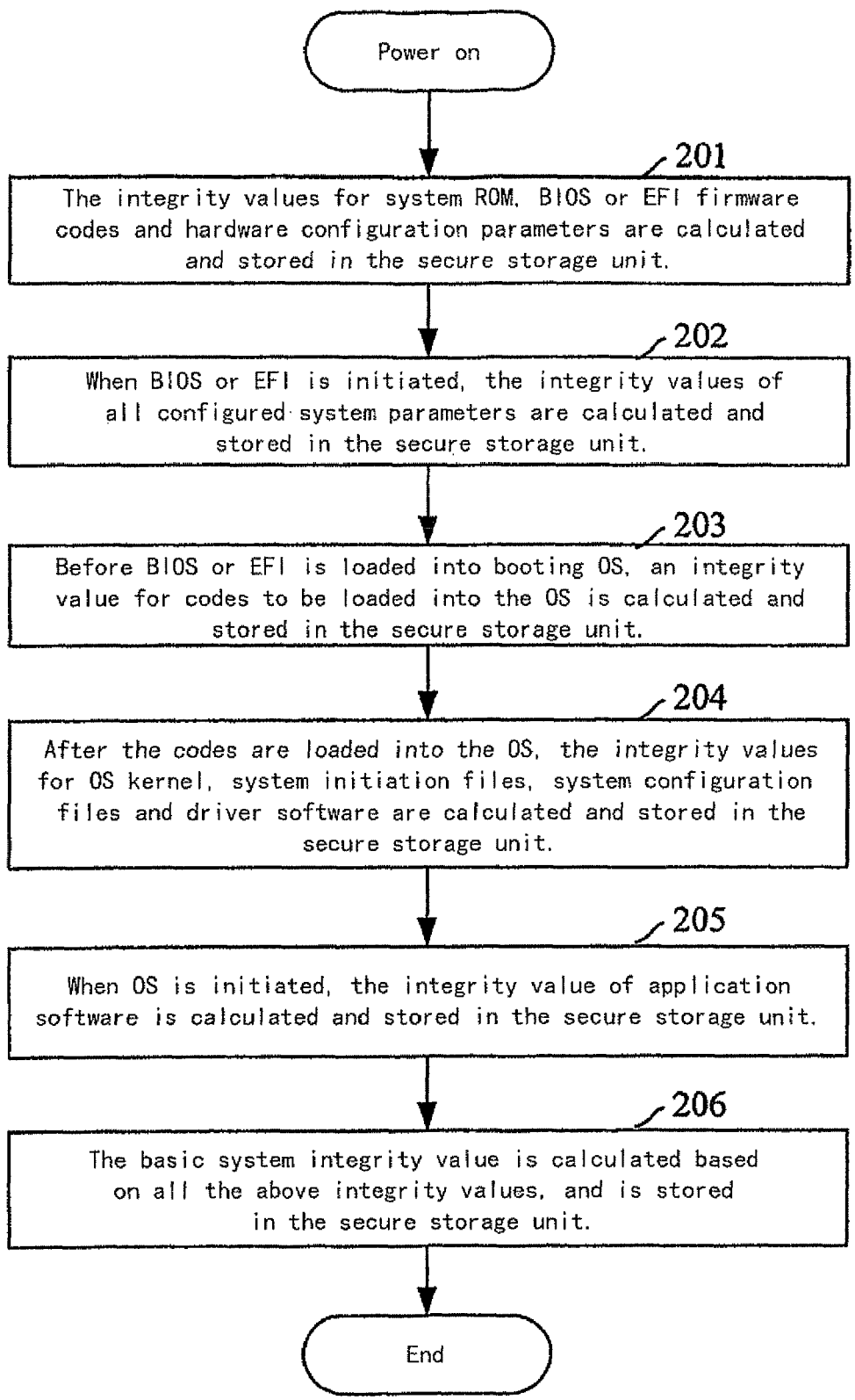
FIG. 2 is an illustrative flowchart of calculating the basic system integrity value by the device waiting to access according to the present invention.

Referring to FIG. 2, FIG. 2 is an illustrative flowchart of calculating the basic system integrity value by the device waiting to access according to the present invention. In this embodiment, the device waiting to access is a computer.

In step 201, each time when the computer is powered on, integrity values for system ROM, BIOS (Basic Input/Output System) or EFI (Extendable Firmware Interface) firmware codes and hardware configuration parameters are calculated and stored in a secure storage unit.

In step 202, when BIOS or EFI is initiated, integrity values for all configured system parameters, main booting sector and system booting partition are calculated and stored in the secure storage unit; wherein the configured system parameters comprises: CPU microcode software, enable or disable status configuration of to various system functions, various authentication passwords, disk configuration parameters, peripheral configuration parameters and security function configuration parameters, etc.

In step 203, before BIOS or EFI is loaded into booting OS, an integrity value for codes to be loaded into the OS is calculated and stored in the secure storage unit.

In step 204, when the codes are loaded into the OS, integrity values for OS kernel, system initiation files, system configuration files and driver software are calculated and stored in the secure storage unit.

In step 205, when the OS is initiated, an integrity value for application software is calculated and stored in the secure storage unit.

In step 206, the basic system integrity value is calculated based on all the integrity values obtained in step 201 to step 205.

The secure storage unit as described above is a secure chip TPM (Trusted Platform Module), a hard disk with security-protecting function, a USB-key or a smart-card.

It should be noted that the flowchart illustrated in FIG. 1 is just one embodiment, and various implementations are possible.

For example, the device waiting to access pre-generates public/private keys, and after the public/private keys are signed by a trusted third party, the public key is pre-stored in the network access authentication device; at this time, the current system integrity value and the signature of the current system integrity value are included in the authentication request sent by the network access authentication device in step 101; and other steps are unchanged.

For another example, the device waiting to access pre-generates public/private keys, but the public/private keys are not signed by a trusted third party; in this case, the current system integrity value, a signature for the current system integrity value, an anonymous identity certificate and the public key are included in the authentication request sent by the network access authentication device in step 101. When the network access authentication device receives the information from the device waiting to access, it firstly authenticates whether the identity of the sender is legal with the received anonymous identity certificate; if the identity is legal, the network access authentication device then authenticates whether the signature is correct with the received public key, and continues the subsequent steps; and if the identity is illegal, the network access authentication is failed and the process is ended.

For yet another example, instead of the public/private keys protection, a symmetric key protection may be used for the information transmitted between the device waiting to access and the network access authentication device. That is to say, it is not necessary for the device waiting to access to generate the public/private keys, but a symmetric key is pre-stored in both the device waiting to access and the network access authentication device. At this time, after the current system integrity value is encrypted with the symmetric key by the device waiting to access, the encrypted current system integrity value is included in the authentication request information to be sent to the network access authentication device. The network access authentication device decrypts the received information, and if it is successful, the judgment operation on the integrity is performed.

The device waiting to access ensuring the current system integrity value in the public/private key manner or in the symmetric key manner aims to ensure that the system integrity value received by the network access authentication device is creditable and hasn't been altered in the transmission.

Of course, the device waiting to access may also transmit its current system integrity value in a form of plaintext directly to the network access authentication device, and may not protect the transmitted system integrity value. However, the approach of transmission is not secure, and is not recommendable.

The above calculation operation on the system integrity value is performed by a module for integrity information collection in the device waiting to access. The above signature or encryption operation is completed by a module for signature and encryption in the device waiting to access. The authentication operation performed by the network access authentication device is completed by an authentication module in the network access authentication device.

To further ensure the security and creditability of the network access authentication, the device waiting to access may perform the authentication on the integrity to the network access authentication device, in order to confirm whether the network access authentication device is secure and creditable. At this time, the device waiting to access also has an authentication module for performing the authentication operation, and the network access authentication device also has an integrity information collection module for calculating the system integrity value and a signature and encryption module for signature or encryption operation.

The implementation in detail is in accordance with the processing for the network access authentication device authenticating the device waiting to access.

That is to say, the system integrity value of the network access authentication device is pre-stored in the device waiting to access; the device waiting to access authenticates whether the received current system integrity value and its stored system integrity value of the network access authentication device are identical or not when the current system integrity value is received from the network access authentication device. If so, the process in FIG. 1 is subsequently performed; otherwise, the process is directly ended.

When the network access authentication device transmits its current system integrity value to the device waiting to access, its current system integrity value may be protected by using the public/private keys or symmetric key approach, in order to ensure the security of the transmitted information in the transmission. The approach of using the public/private keys or symmetric key is similar to the aforementioned approach, and will not be described again.

The network access authentication device as described above consists of one server, or a firewall, a switch or a router together with an authentication server. When the network access authentication device consists of one server, the server completes the operations of receiving information, authenticating information creditability and authenticating the integrity. When the network access authentication device consists of the firewall, the switch or the router together with the authentication server, the firewall, the switch or the router transmits the information from the device waiting to access to the server. The server performs the operations of authenticating the information creditability and authenticating the integrity. Then, the server returns the results of the authentications to the firewall or the router, and the firewall or the router returns the results of the authentications to the device waiting to access.

The information interacting between the network access authentication device and the device waiting to access may be carried via an SSL (Secure Socket Layer) protocol, a TLS (transport Layer Security) protocol, an IPv6 protocol, or an IKE protocol (Internet Key Exchange) in IPSec protocol (Internet Protocol Security). The opportunity of sending integrity value by the device waiting to access when the above protocols are used between the network access authentication device and the device waiting to access will be further explained below. The transmission approach of the device waiting to access in detail and the authentication approach of the network access authentication device are similar with the above approaches and will not be explained in detail again.

When the SSL protocol or the TLS protocol is used between the network access authentication device and the device waiting to access, the device waiting to access is used as a client and the network access authentication device is used as a server. When the client receives a ServerHello message from the server, the calculated integrity value is sent to the server with a handshake protocol. The server authenticates whether the received integrity value and the pre-stored is integrity value are identical or not. If so, the handshake protocol is continued; otherwise the handshake protocol is stopped. Or, the client sends the calculated integrity value to the server together with a ClientHello message; the server authenticates whether the received integrity value and the pre-stored integrity value are identical or not after receiving the ClientHello message from the client. If so, the handshake protocol is continued; otherwise the handshake protocol is stopped.

When the IPv6 or IKE in the IPSec is used between the network access authentication device and the device waiting to access, the device waiting to access is used as an Initiator and the network access authentication device is used as a Responder. The Initiator sends the integrity value to the network access authentication device with a handshake protocol when it sends HDR, SA. The network access authentication device authenticates whether the received integrity value and the pre-stored integrity value are identical. If so, the authentication is successful and the subsequent steps are continued; otherwise, the handshake protocol is stopped.

If a message containing the integrity value is sent individually, the message comprises at least identification information and length information of the integrity value and the detailed integrity value information. If the integrity value is sent along with an existing message, a plurality of fields are added into the existing message in order to carry the identification information and length information of the integrity value and the detailed integrity value information; or the identification information and length information of the integrity value and the detailed integrity value information are carried in the preserved fields in the existing message.

The above is only the preferred embodiments of the present invention and the present invention is not limited thereto. Therefore, any modifications, substitutions and improvements to the present invention are possible without departing from the spirit and scope of the present invention.

What is claimed is:

1. A method for realizing network access authentication, wherein a network access authentication device pre-storing a system integrity value of a device waiting to access which is calculated by the device waiting to access itself, and a correspondence between each device waiting to access and its system integrity value, the method comprises the following steps:

a). the device waiting to access acquires its current system integrity value, and sends an authentication request including information containing the current system integrity value to the network access authentication device;

b). the network access authentication device judges whether the current system integrity value of the device waiting to access in the received authentication request and its stored system integrity value of the device waiting to access are identical or not, according to the received authentication request and the correspondence; and, in a case where the received current system integrity value of the device waiting to access in the received authentication request and its stored system integrity value of the device waiting to access are identical, the network access authentication device determines that the network access is authenticated, so that the device waiting to access is allowed to access the network; otherwise, the network access authentication device determines that the network access is unauthenticated, so that the device waiting to access is not allowed to access the network, wherein the device waiting to access is a computer, and the process of calculating its basic system integrity value comprises the following steps:

i) when basic input/output system (BIOS) or extensible firmware interface (EFI) is initiated, integrity values for all configured system parameters, main booting sector and system booting partition are calculated and stored in the secure storage unit;

ii) using the integrity values mentioned in the step i) as the basic system integrity value, iii) before BIOS or EFI is loaded into booting OS (operating system), an integrity value for codes to be loaded into the OS is calculated and stored in the secure storage unit;

iv) when the codes are loaded into the OS, integrity values for OS kernel, system initiation files, system configuration files and driver software are calculated and stored in the secure storage unit;

v) when the OS is initiated, an integrity value for application software is calculated and stored in the secure storage unit; and vi) the basic system integrity value is calculated based on all the integrity values obtained in step i) to step vi) and wherein the configured system parameters comprise: central processing unit (CPU) microcode software, enable or disable status configuration of various system functions, various authentication passwords, disk configuration parameters, peripheral configuration parameters and security function configuration parameters.

2. The method according to the claim 1, wherein the current system integrity value is a basic system integrity value;

the step a) of the device waiting to access acquiring its current system integrity value comprises:

when the device waiting to access is initiated, its current basic system integrity value is calculated and stored in a secure storage unit; when it needs to access the network, the device waiting to access extracts the basic system integrity value directly from the secure storage unit as the current system integrity value.

3. The method according to the claim 1, wherein the current system integrity value is a system integrity value calculated with a basic system integrity value and a module for network access;

the step a) of the device waiting to access acquiring its current system integrity value comprises:

when the device waiting to access is initiated, its current basic system integrity value is calculated and stored in a secure storage unit; when it needs to access the network, the device waiting to access extracts the basic system integrity value directly from the secure storage unit, and performs integrity calculation with the module for network access in order to obtain the calculated value as its current system integrity value.

4. The method according to the claim 3, wherein the module for network access comprises a driver module for link layer network, a software module for network layer and transport layer protocols and a software module for network access application.

5. The method according to the claim 2, wherein the secure storage unit is a secure chip trusted platform module (TPM), a hard disk with security-protecting function, a universal serial bus (USB-key) or a smart-card.

6. The method according to the claim 1, wherein the step b) further comprises:

authenticating the creditability of the received information.

7. The method according to the claim 6, wherein the device waiting to access pre-generates public/private keys, and the public/private keys are signed by a trusted third party;

before the device waiting to access sends the authentication request, the step a) comprises: the current system integrity value is signed with the private key; wherein information in the authentication request is the current system integrity value in plaintest, and the authentication request further comprises a signature for the current system integrity value and the public key;

the authentication to the creditability of the received information comprises: the network access authentication authenticates where the received signature is correct by using the received public key; and if so, judges that the received information is creditable; otherwise, judges that the received information is not creditable.

8. The method according to the claim 6, wherein the device waiting to access pre-generates public/private keys and the public/private keys are signed by a trusted third party, wherein the public key is pre-stored in the network access authentication device;

before the device waiting to access sends the authentication request, the step a) further comprises: the current system integrity value is signed with the private key; wherein information in the authentication request is the current system integrity value in plaintext, and the authentication request further comprises a signature for the current system integrity value;

the authentication to the creditability of the received information comprises: the network access authentication device authenticates whether the received signature is correct by using the pre-stored public key; and if so, judges that the received information is creditable; otherwise; judges that the received information is not creditable.

9. The method according to the claim 6, wherein the device waiting to access pre-generates public/private keys and the public/private keys are not signed by a trusted third party;

before the device waiting to access sends the authentication request, the step a) further comprises: the current system integrity value is signed with the private key; wherein information in the authentication request is the current system integrity value in plaintext, and the authentication request further comprises a signature for the current system integrity value, an anonymous identity certificate and the public key;

the authentication to the creditability of the received information comprises: after the network access authentication device authenticates that the identity of the sender is legal with the received anonymous identity certificate, the network access authentication device authenticates whether the signature is correct with the received public key; and if so, judges that the received information is creditable; otherwise, judges that the received information is not creditable.

10. The method according to the claim 6, wherein the device waiting to access and the network access authentication device pre-store a symmetric key;

before the device waiting to access sends the authentication request, the step a) further comprises: the current system integrity value is encrypted with the symmetrical key; wherein information in the authentication request is the symmetrical-key-encrypted current system integrity value;

the authentication to the creditability of the received information comprises: the network access authentication device decrypts the received information with its stored symmetric key; and judges that the received information is creditable in case of successful decryption, whereas judges that the received information is not creditable in case of unsuccessful decryption.

11. The method according to the claim 1, wherein the method further comprises:

a system integrity value of the network access authentication device is pre-stored in the device waiting to access;

after the device waiting to access acquires the current system integrity value of the network access authentication device and authenticates that the acquired current system integrity value of the network access authentication device and the stored system integrity value of the network access authentication device are identical, the step 1) is performed then.

12. The method according to the claim 1, wherein the network access authentication device consists of one server, or a firewall, a switch or a router together with an authentication server.

13. The method according to the claim 1, wherein the method further comprises:

in a case where the current system integrity value of the device waiting to access in the received authentication request and the stored system integrity value of the device waiting to access are not identical, the network access authentication device sends to the device waiting to access an alarm prompt indicating that the device waiting to access is not secure.

14. The method according to the claim 1, wherein when the information interacting between the network access authentication device and the device waiting to access is carried via an secure sockets layer (SSL) protocol or a transport layer security (TLS) protocol, after the device waiting to access in the step a) receives a ServerHello message from a server, the information containing the integrity value is sent to the network access authentication device with a handshake protocol; or the information containing the integrity value is included in a ClientHello message sent by the device waiting to access in the step a);

when the information interacting between the network access authentication device and the device waiting to access is carried via the internet protocol version 6 (IPv6) protocol or the internet key exchange (IKE) protocol in internet protocol security (IPSec), the device waiting to access in the step a) sends the information containing the integrity value to the network access authentication device with a handshake protocol when sending header, security association (HDR, SA).

* * * * *